United States Patent
Rielau et al.

(10) Patent No.: US 7,162,505 B2
(45) Date of Patent: Jan. 9, 2007

(54) CLASSIFICATION OF DATA FOR INSERTION INTO A DATABASE

(75) Inventors: Serge Rielau, Ajax (CA); Roberta J. Cochrane, Los Gatos, CA (US); George Lapis, San Jose, CA (US); Hamid Pirahesh, San Jose, CA (US); Richard S. Sidle, Mountain View, CA (US); Biao Zhu, Toronto (CA)

(73) Assignee: International Business Machines Corporation, Armonk, NY (US)

(*) Notice: Subject to any disclaimer, the term of this patent is extended or adjusted under 35 U.S.C. 154(b) by 497 days.

(21) Appl. No.: 10/393,852

(22) Filed: Mar. 21, 2003

(65) Prior Publication Data

US 2003/0204540 A1    Oct. 30, 2003

(30) Foreign Application Priority Data

Apr. 29, 2002  (CA) ................... 2384174

(51) Int. Cl.
  *G06F 12/00*  (2006.01)
  *G06F 17/30*  (2006.01)
(52) U.S. Cl. ..................... 707/204; 707/201
(58) Field of Classification Search .......... 707/10, 707/201–204
See application file for complete search history.

(56) References Cited

U.S. PATENT DOCUMENTS

| | | | |
|---|---|---|---|
| 5,706,494 A | | 1/1998 | Cochrane et al. |
| 5,806,075 A | * | 9/1998 | Jain et al. ............ 707/201 |
| 5,960,426 A | | 9/1999 | Pirahesh et al. |
| 6,085,189 A | | 7/2000 | Pirahesh et al. |
| 6,233,588 B1 | * | 5/2001 | Marchoili et al. ....... 707/200 |
| 6,516,327 B1 | * | 2/2003 | Zondervan et al. ..... 707/200 |
| 6,842,906 B1 | * | 1/2005 | Bowman-Amuah ...... 719/330 |
| 6,901,403 B1 | * | 5/2005 | Bata et al. ............ 707/101 |
| 2002/0091716 A1 | * | 7/2002 | Yokouchi ............... 707/200 |

OTHER PUBLICATIONS

MSDN Magazine 2000, *SQL Server 2000: New Features Provide Unmatched Ease of Use and Scalability to Admins and Users* [online] Aug. 2000 [retrieved Jul. 9, 2001].

* cited by examiner

*Primary Examiner*—Leslie Wong
*Assistant Examiner*—Usmaan Saeed
(74) *Attorney, Agent, or Firm*—Sawyer Law Group LLP

(57) ABSTRACT

A method and system for use in a computing environment for selecting a subset of records from a set of records for placement of the subset of records in a plurality of destinations. A group of replica records is formed for a record of the subset of records, and a destination identification is assigned to each replica record, except one, of the group of replica records. A replica record associated with one of the plurality of destinations can be selected and can be placed in the associated destination.

44 Claims, 10 Drawing Sheets

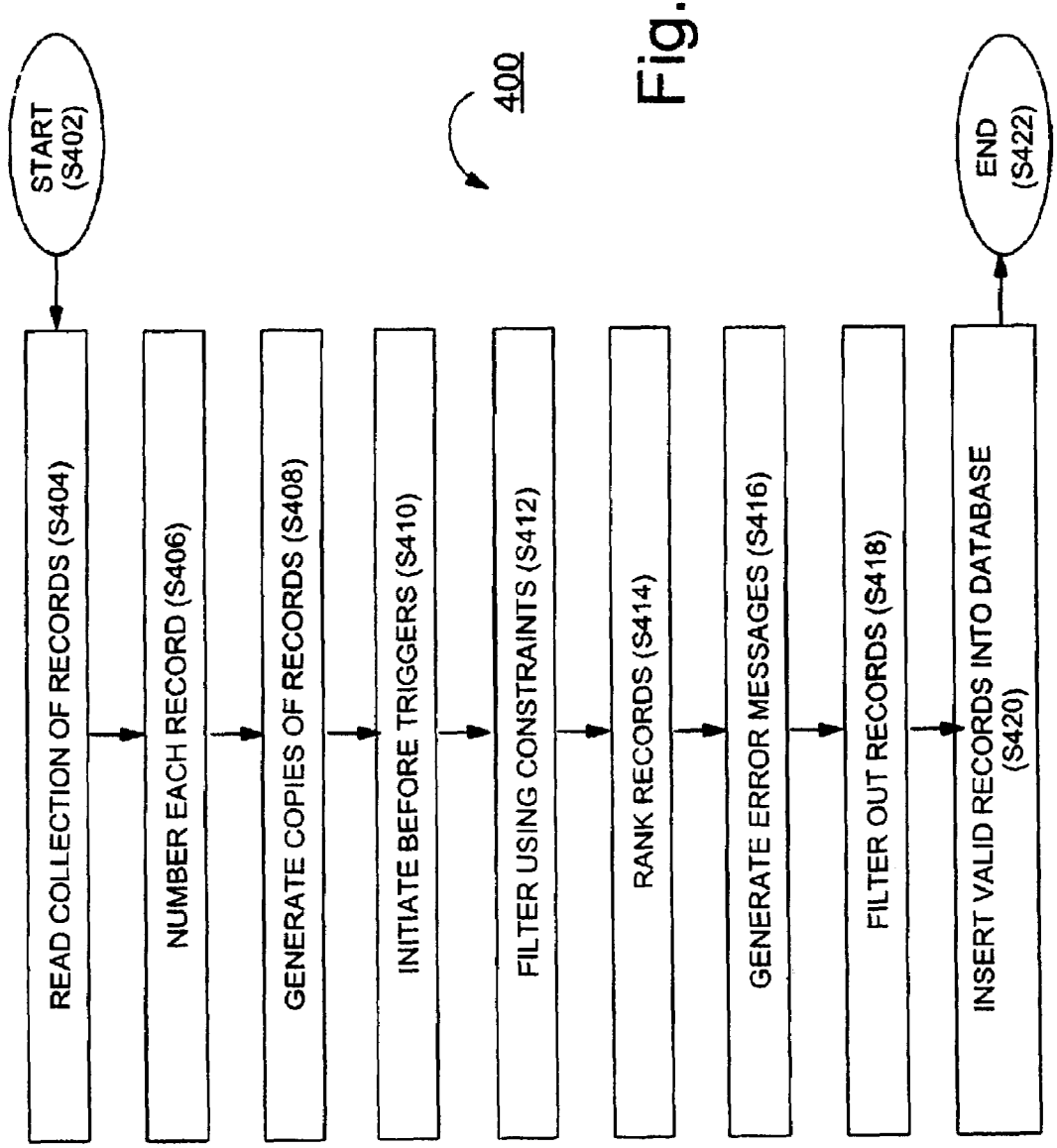

CLASSIFICATION OF DATA FOR INSERTION INTO A DATABASE

FIELD OF THE INVENTION

This invention relates to databases, and more specifically to inserting data into a database.

BACKGROUND OF THE INVENTION

A Modern Database Management System (DBMS) provides views to separate a lower level database design from an application. Views are database objects having result sets defined by a query (the database views are not physically stored objects). Typically, the application can perform database query commands, such as operations of SELECT, UPDATE, INSERT and DELETE in SQL (Structured Query Language), against a view and does not need to be aware of the definition of the view and its underlying data sources.

One common definition of a view is a UNION ALL VIEW, which unifies data from multiple database (for example, multiple tables). For example, a UNION ALL view can represent a phone book of telephone numbers located in the Province of Ontario, which is a combination of tables representing phone books of Toronto and other areas of Ontario.

While it is known how operations such as SELECT, UPDATE and DELETE operate on such views, the INSERT operation poses problems. One such problem is that it is unclear into which base table to place a record that is being inserted through the UNION ALL view. There are four known approaches for addressing this problem that are known to the inventors.

A first approach avoids using the UNION ALL view for INSERT. Instead, an application provides logic that decides which record belongs into which table and then inserts the records accordingly. One drawback of this approach is that this solution violates the idea that the UNION ALL be encapsulated inside the view and the application does not need not to be aware of its makeup. Another drawback of this approach is that the procedural logic limits the performance of the solution.

A second approach extends the SQL INSERT statement to allow for inserts into multiple tables instead of just allowing insert into one table. This is accomplished by using predicates to decide which records belong in which table. This may address the performance problem, but the second approach appears to be poorly encapsulated.

A third approach uses INSTEAD OF triggers. These are descriptions (using the first and second approaches) which are executed whenever a specific operation (such as INSERT) is being performed against an UNION ALL view. This approach may solve the encapsulation problem. However, triggers tend to be heavy weight and thus do not perform well enough.

The three foregoing approaches may often cause excessive evaluation of the predicates used for dispatching the records into the respective target tables. The reason for this is that in these scenarios the target tables often have constraints that limit which records may be inserted into a given table, and these constraints are the same predicates used in the SQL dispatch statement so that in effect there is double the effort to evaluate the same predicate.) A predicate is a search condition specified in an SQL (Search Query Language) statement.)

In a fourth approach, a record that is inserted into an UNION ALL view is considered to belong to the table that will accept it as long as one, and only one table will accept the record. Otherwise the record shall be rejected. A known system provided by Microsoft™ in the product SQL Server 2000 may call for heavy restrictions on semantics in the fourth approach. Namely it requires that the constraints being defined on the target tables be very simple and it requires that the DBMS can prove that no record can exist which could belong to more than one table. These are very stringent rules which allow only for simple cases. For example, known database management systems (using the fourth approach) can handle INSERT entries into the above mentioned Ontario phone book if the base phone books are partitioned by the names of cities (a single column). But it cannot handle a design where a secondary column is also required, such as, for example if the Toronto phone book is split into two volumes my Names A–L and M–Z. Furthermore the known database management systems (using the fourth approach) are not capable of dealing with BEFORE TRIGGERs. Before triggers are modifications to the records made prior to inserting them into the target table. Since before triggers can perform different actions for different tables and they have to be executed before the decision is made into which table the modified record is placed this is not trivial.

Accordingly, a solution that addresses, at least in part, this and other shortcomings is desired.

SUMMARY OF THE INVENTION

In one aspect of the invention, there is provided a method for use in a computing environment for selecting a subset of records from a set of records for placement of the subset of records in a plurality of destinations, including forming a group of replica records for a record of the subset of records, and assigning a destination identification to each replica record, except one, of the group of replica records.

In another aspect of the invention, there is provided a computer readable medium for use with a data processing system having a central processing unit and associated memory, the program instructions for instructing the data processing system to implement a method for selecting a subset of records from a set of records and placing the subset of records in a plurality of destinations. The method includes forming a group of replica records for a record of said subset of records, and assigning a destination identification to each replica record, except one, of the group of replica records.

In yet another aspect of the invention, there is provided a data processing system including a record allocator for allocating a plurality of destinations for a plurality of records from a set of records, and a record selector for selecting a subset of records from the plurality of records for subsequent placement of the selected records in the plurality of destinations. Each destination has an associated record modification rule and an associated record acceptance rule.

In yet another aspect of the invention, there is provided a computer readable medium including program instructions for use with a data processing system having a central processing unit and associated memory, the program instructions for instructing the data processing system to implement a data processing system comprising a record allocator for allocating a plurality of destinations for a plurality of records from a set of records, and a record selector for selecting a subset of records from the plurality of records for subsequent placement of the selected records in the plurality of destinations, where each destination has an associated record modification rule and an associated record acceptance rule.

In yet another aspect of the invention, there is provided a method for use in a computing environment for selecting records from a set of records for subsequent placement of selected records in a plurality of destinations, each destination having an associated record modification rule and an associated record acceptance rule. A destination identification is assigned to each replica record of a group of replica records except one replica record in the group, where each of a plurality of groups of replica records corresponds to a particular record of the set of records. A null destination is assigned to the one replica record of the group of replica records.

In yet another aspect of the invention, there is provided a computer readable medium including program instructions for use with a data processing system having a central processing unit and associated memory, the program instructions for instructing the data processing system to implement a method for use in a computing environment for selecting records from a set of records for subsequent placement of selected records in a plurality of destinations, each destination having an associated record modification rule and an associated record acceptance rule, where the method includes assigning a destination identification to each replica record of a group of replica records except one replica record in the group, each of a plurality of groups of replica records corresponding to a record of the set of records, and assigning a null destination to the one replica record of the group of replica records.

In yet another aspect of the invention, there is provided a data processing system including a record creator for directing said data processing system to create a group of replica records corresponding to a record of a set of records, and a record selector for directing the data processing system to select the replica records for subsequent placement of selected replica records in a plurality of destinations, where each of the destinations has an associated record modification rule and an associated record acceptance rule.

In yet another aspect of the invention, there is provided a computer readable medium including program instructions for use with a data processing system having a central processing unit and associated memory, the program instructions for instructing the data processing system to implement a data processing system comprising a record creator for directing the data processing system to create a group of replica records corresponding to a record of a set of records, and a record selector for directing the data processing system to select the replica records for subsequent placement of selected replica records in a plurality of destinations, where each of the destinations has an associated record modification rule and an associated record acceptance rule.

A better understanding of these and other embodiments of the present invention can be obtained with reference to the following drawings and description of the preferred embodiments.

BRIEF DESCRIPTION OF THE DRAWINGS

FIG. 4 shows operations of the record selector of FIG. 1.

DETAILED DESCRIPTION

The present invention provides a solution allowing records of information to be classified for delivery to different targets or destinations even though it is not predictable as to which target a given unit of data should be routed. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Records of information are classified for delivery to different targets or destinations even though it is not predictable (that is, without looking at each record) as to which target a given unit of data (such as a record) should be routed. Classification allows updating a database (such as a table) through an insert command. Generally, it cannot be predicated into which table a given record should be inserted when there are multiple tables or destinations from which to choose. Using this approach, UPDATE/DELETE/INSERT commands may be used with UNION ALL views on the database.

With the approach of the present invention, arbitrarily complex table constraints can be used to define INSERT through UNION ALL views, and BEFORE TRIGGERs are allowed.

Figure 1:
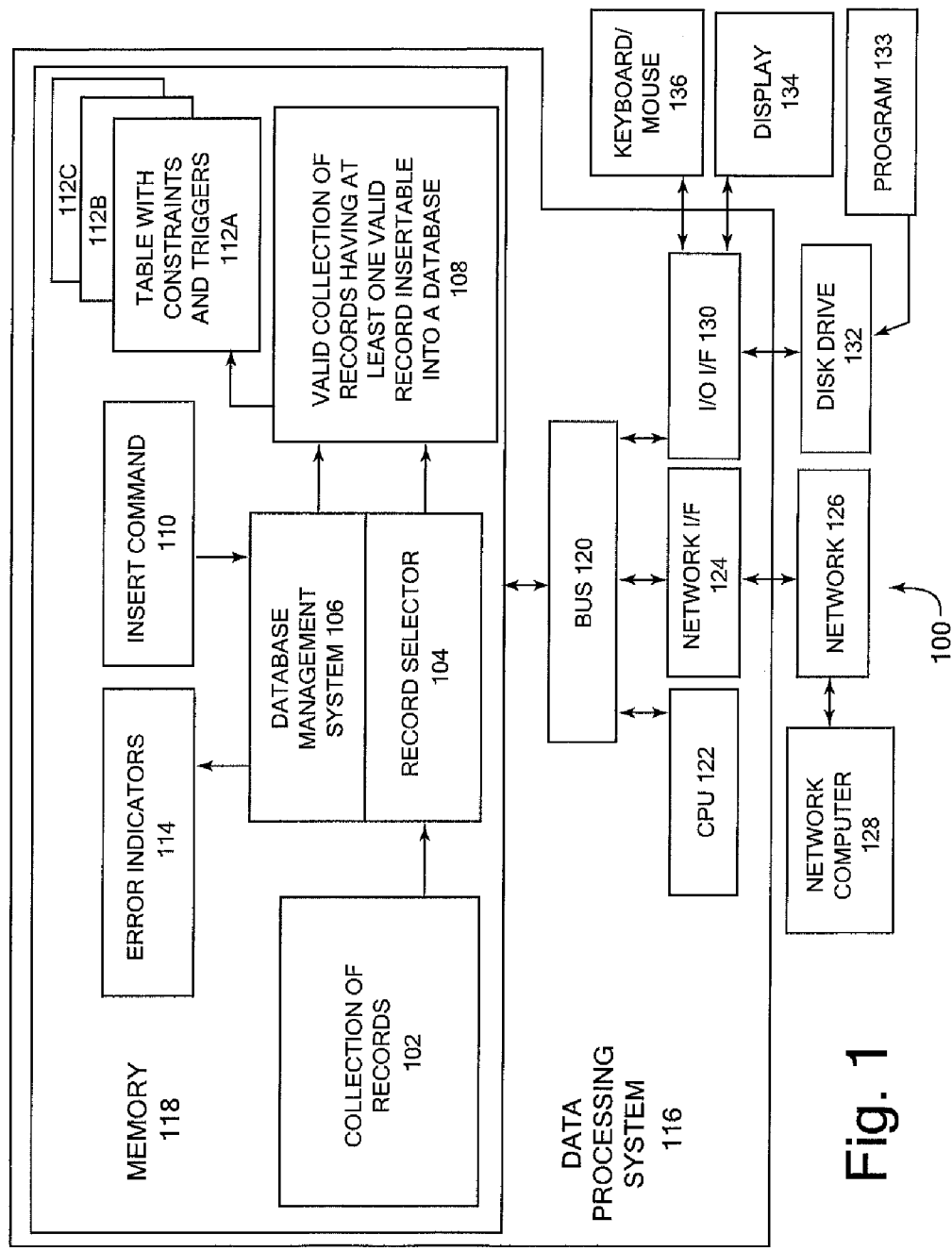
FIG. 1 shows a computing environment having a record selector.

FIG. 1 shows computing environment 100 having a data processing system 116 providing operation for inserting a record into a table. Data processing system 116 includes components and/or subsystems such as memory 118, central processing unit (CPU) 122, network interface (I/F) 124 and input/output (I/O) interface 130 all operatively connected through bus 120. Various subsystems such as keyboard and/or pointing device (such as a mouse) 136, display unit 134, and disk drive unit 132 are all connected to data processing system 116 via I/O interface 130. Optionally, data processing system 116 is operatively connected to network 126 which in turn is operatively connected to network computer 128. In a preferred embodiment, the method is incorporated in a DBMS 106.

Stored in memory 118 are various elements such as collection of records 102, record selector 104, database management system (DBMS) 106, valid collection of records 108, tables 112A, 112B, and 112C, insert command 110, and error indicators 114. It will be appreciated that the elements loaded in memory 118 can reside in memory of various computer systems operatively connected together via a network such as the Internet. However, for simplified explanation of the description of preferred embodiments of the present invention, a single unit of memory 118 stores the identified elements. It will be appreciated that the record selector 104 can be implemented as a computer program product having computer programmed instructions or code for directing the data processing system to achieve desired operations. Alternatively, the record selector 104 can be implemented as a combination of signal carrying circuits and/or computer programmed instructions.

DBMS 106 operates in computing environment 100 and accepts insert command 110 for directing DBMS 106 to insert collection of records 102 into one or more tables (databases) 112A, 112B and 112C. Insert command 110 does not have to be aware of the existence of tables 112A, 112B, 112C. DBMS 106 requests record selector 104 to select a subset of records from a group or collection of records 102 which can be insertable into tables 112A 112B, 112C.

Record selector 104 is a computer program having instructions for directing CPU 122 to select records from collection of records 102 and subsequently generate a valid collection of records 108 which is a sub-set of collection 102. The records associated with collection of records 108 are insertable into the tables 112A, 112B, and/or 112C. It will be appreciated that record selector 104 can be configured to operate as a component of DBMS 106 or can be configured to operate independently of DBMS 110. In a preferred embodiment, record selector 104 is a set of computer instructions or code having instructions for directing CPU 122 to achieve tasks as will be discussed below.

It will be appreciated that record selector 104 can be delivered to memory 118 via disk drive unit 132 interacting with a computer readable product such as a floppy disk or CD 133 having a media tangibly embodying the executable code, or can be delivered to memory 118 by signalized download of executable code via network 126 and network I/F 124. In summary, FIG. 1 shows a computing system having a record selector operating to select records from a set of records for subsequent placement of selected records in a plurality of destinations (such as tables) each having an associated record modification rule and an associated record acceptance rule. The operations of record selector 104 will be described in greater detail in FIG. 4. In a preferred embodiment of the present invention, record selector 104 is implemented as a set of computer programmed instructions written in a computer programming language, in which the instructions direct a CPU to perform desired operations as will be described in further detail below. Alternatively, in another embodiment of the present invention, computer hardware circuits or mechanisms perform the operations of the record selector 104 which will be described in greater detail below. In another embodiment of the present invention, an operative combination of computer programmed instructions and computer hardware circuits can implement the operations of record selector 104.

Figure 2:
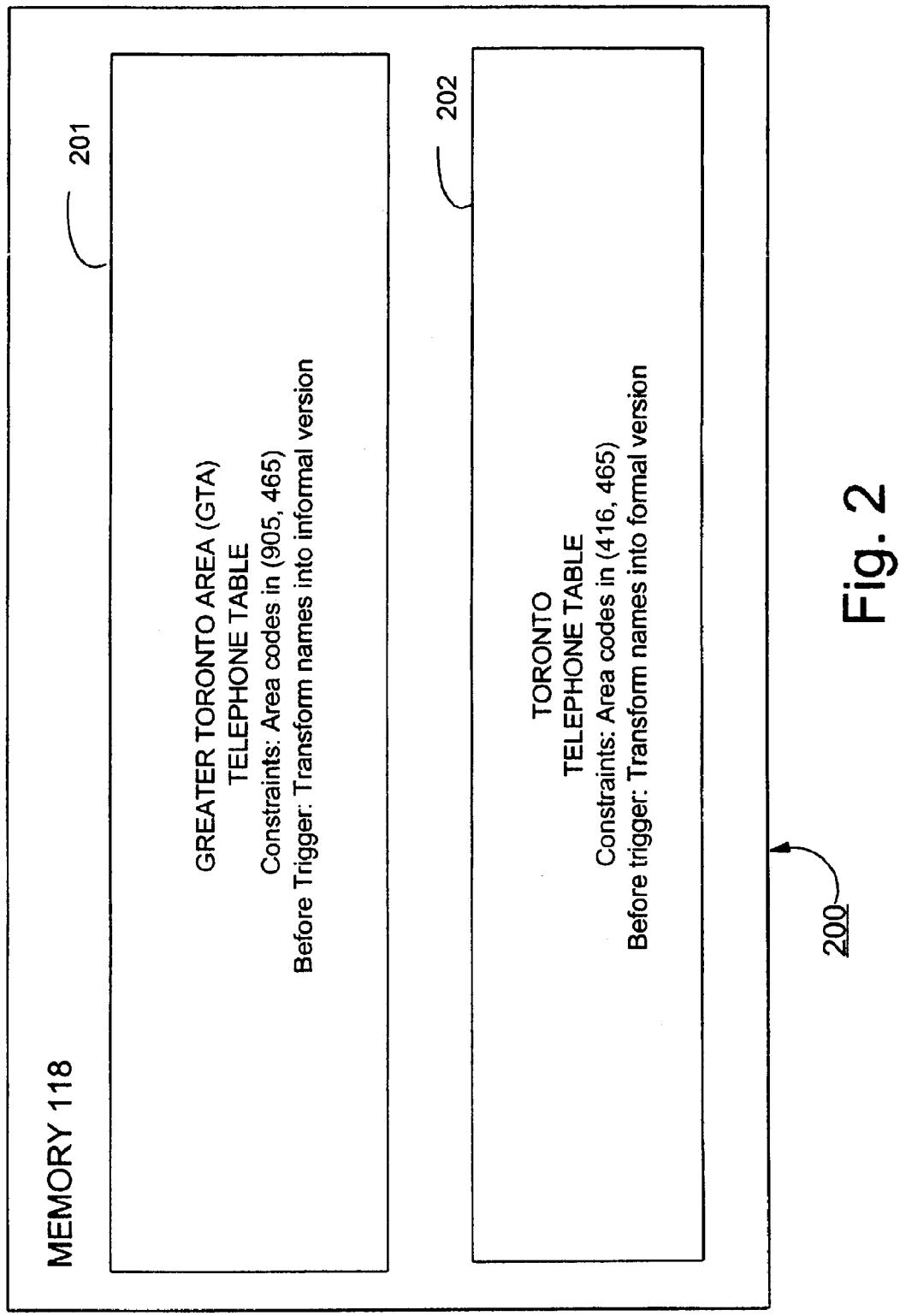
FIG. 2 shows an example of target tables to receive records selected by the record selector of FIG. 1.

FIG. 2 shows the Toronto phone book table 202 with constraints (that is, a record acceptance rule) accepting only '416' and '465' area codes and a before trigger (that is, a record modification rule) which transforms provided names (that is, aspects) into their formal version. GTA phone book table 201 with constraints accepting only '905' and '465' area codes and a before trigger which transforms provided names into their informal version.

Another embodiment of the present invention provides a method of operations for use in a computing environment for selecting records from a set of records for subsequent placement of selected records in many different destinations, in which each destination has an associated record modification rule and an associated record acceptance rule. The operations of record selector 104 will be described below in greater detail below. It will be appreciated that a record modification rule can include 'no operation' (that is, no rule is operated or executed) within the scope of a record modification rule. It will be appreciated that a record acceptance rule can include a "tautology" condition (that is, the constraint is always true, there is no constraint) within the scope of a record acceptance rule. Additionally, the record modification rule and the record acceptance rule can include a collection or combination of rules.

Figure 3A:
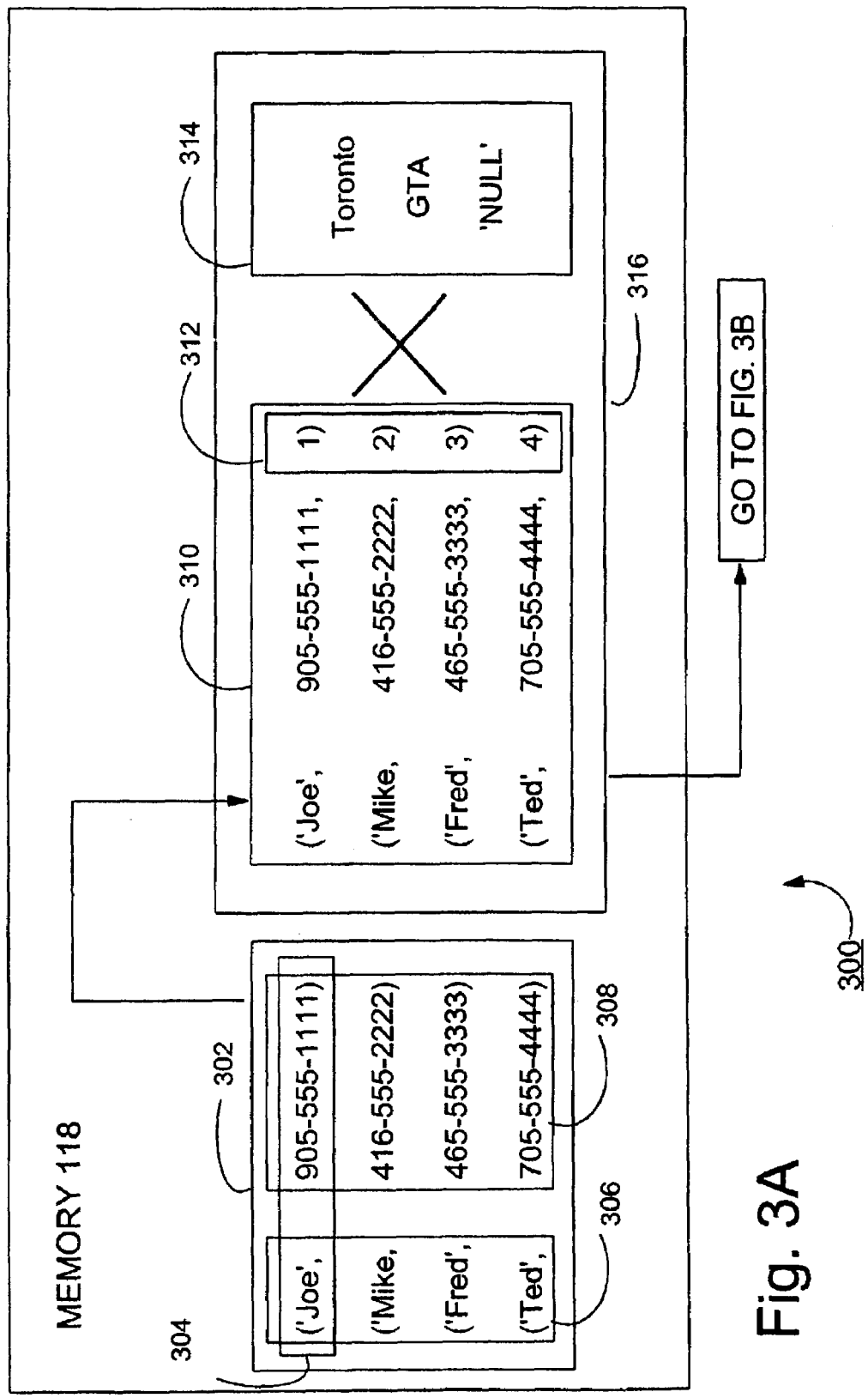
FIGS. 3A to 3G show collections of records generated by the record selector of FIG. 1.
Figure 3B:
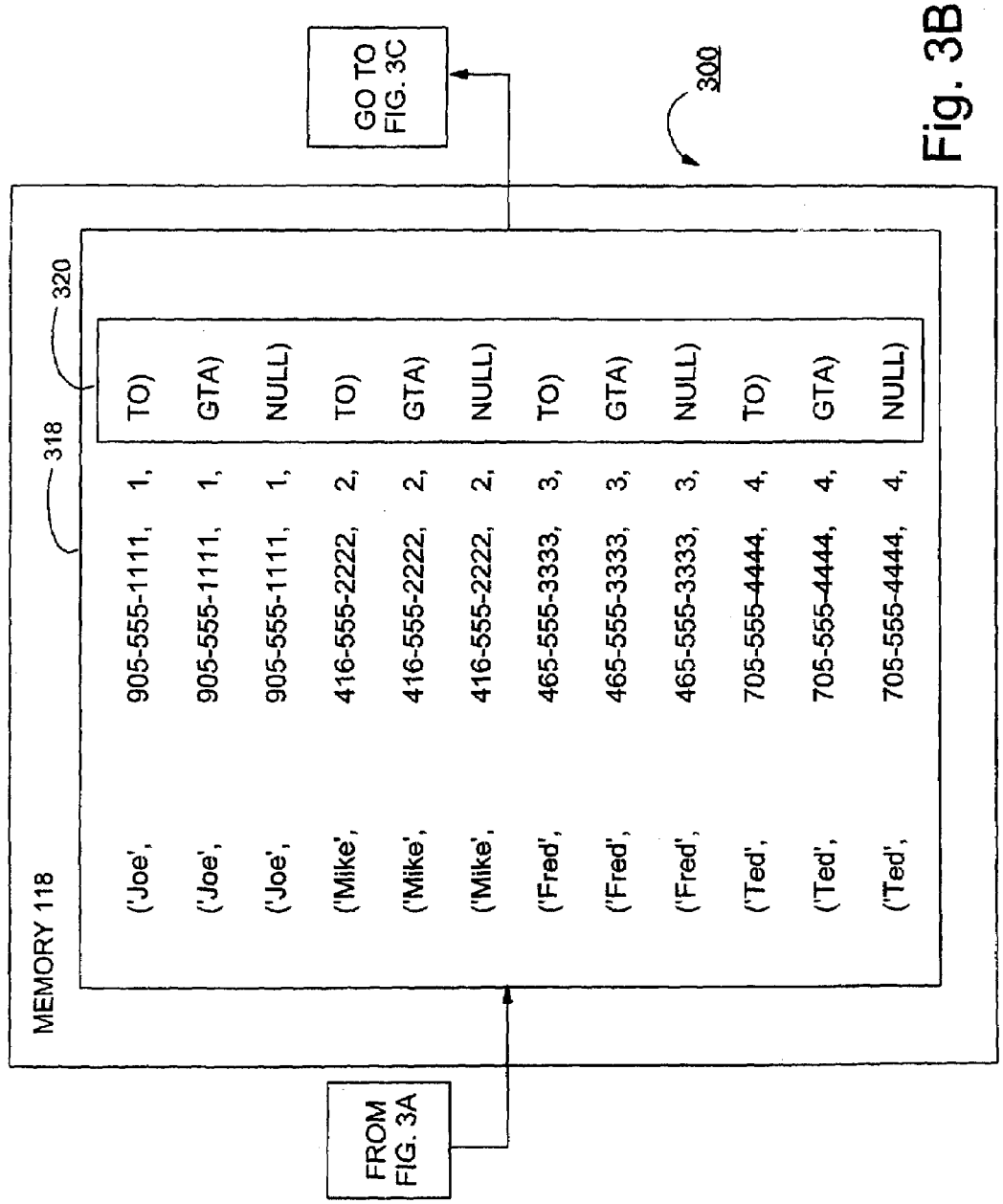
Figure 3C:
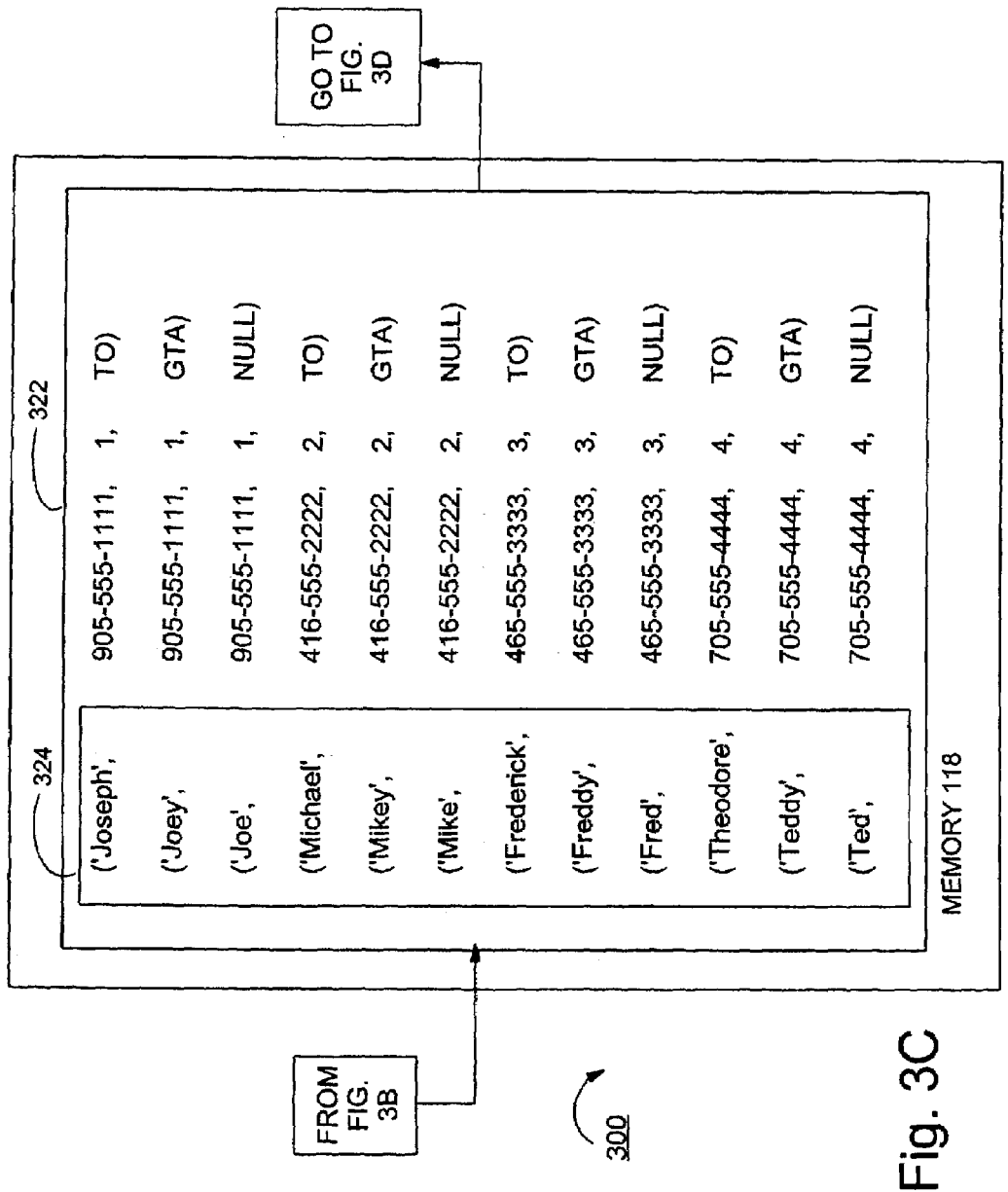
Figure 3D:
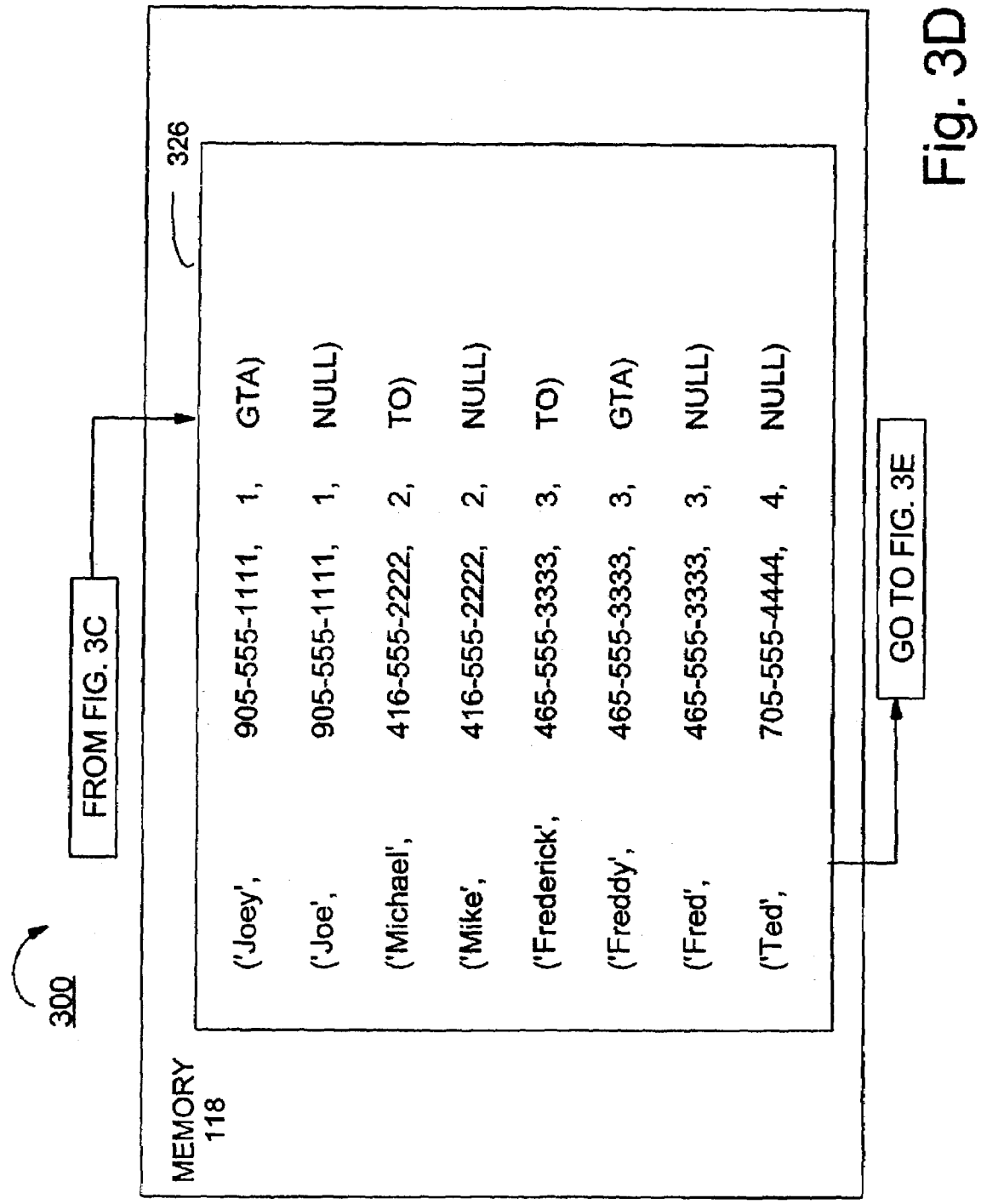
Figure 3E:
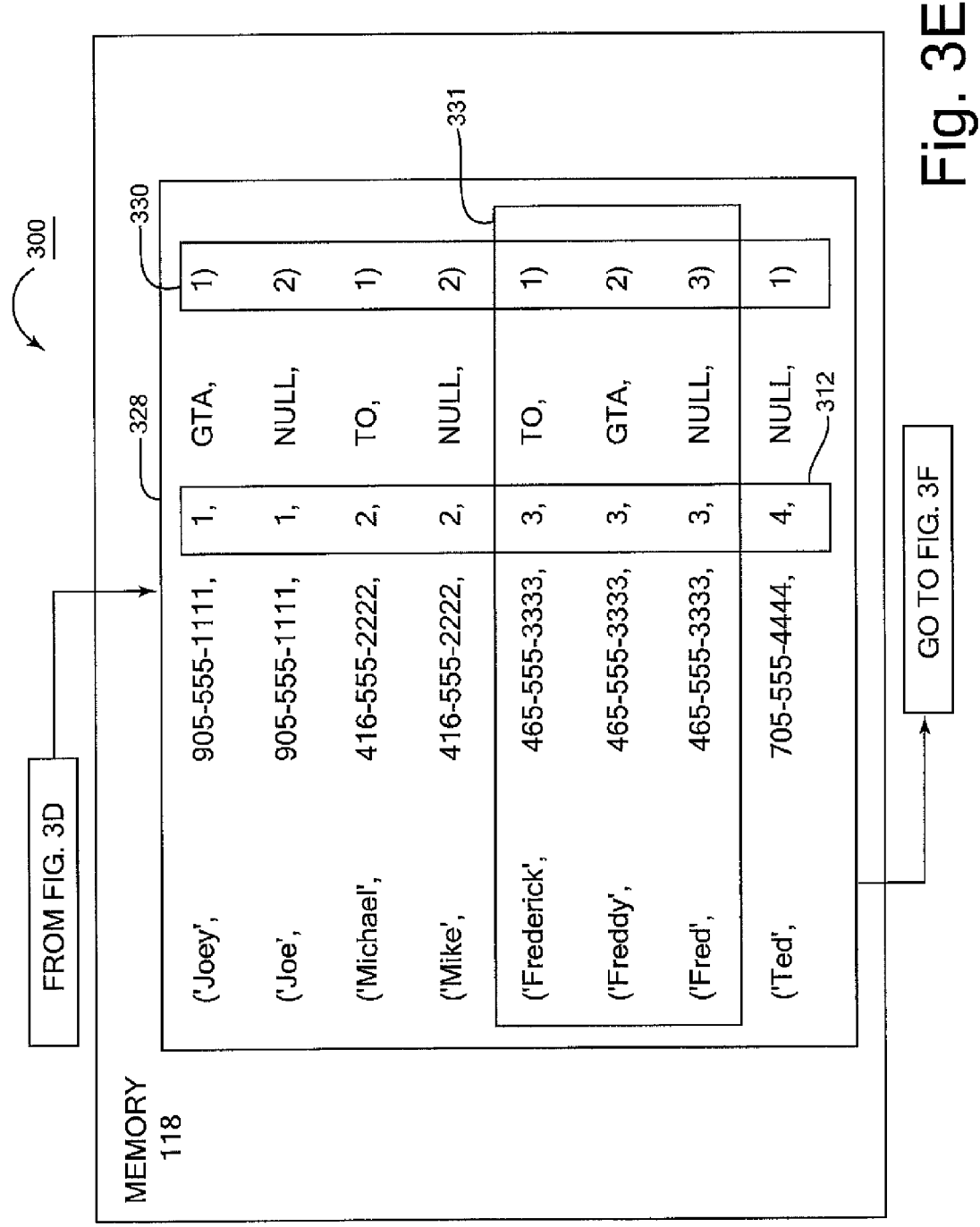
Figure 3F:
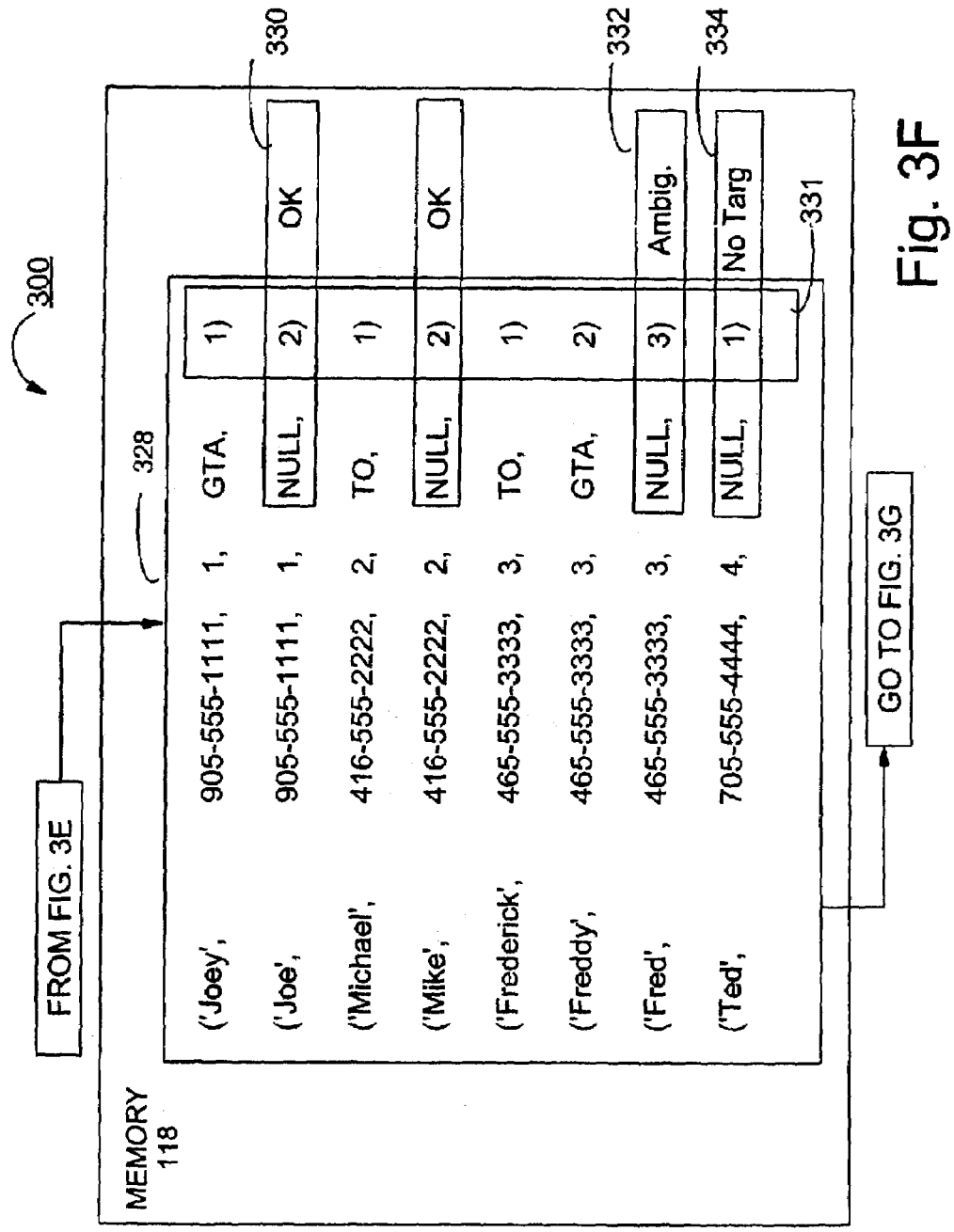
Figure 3G:
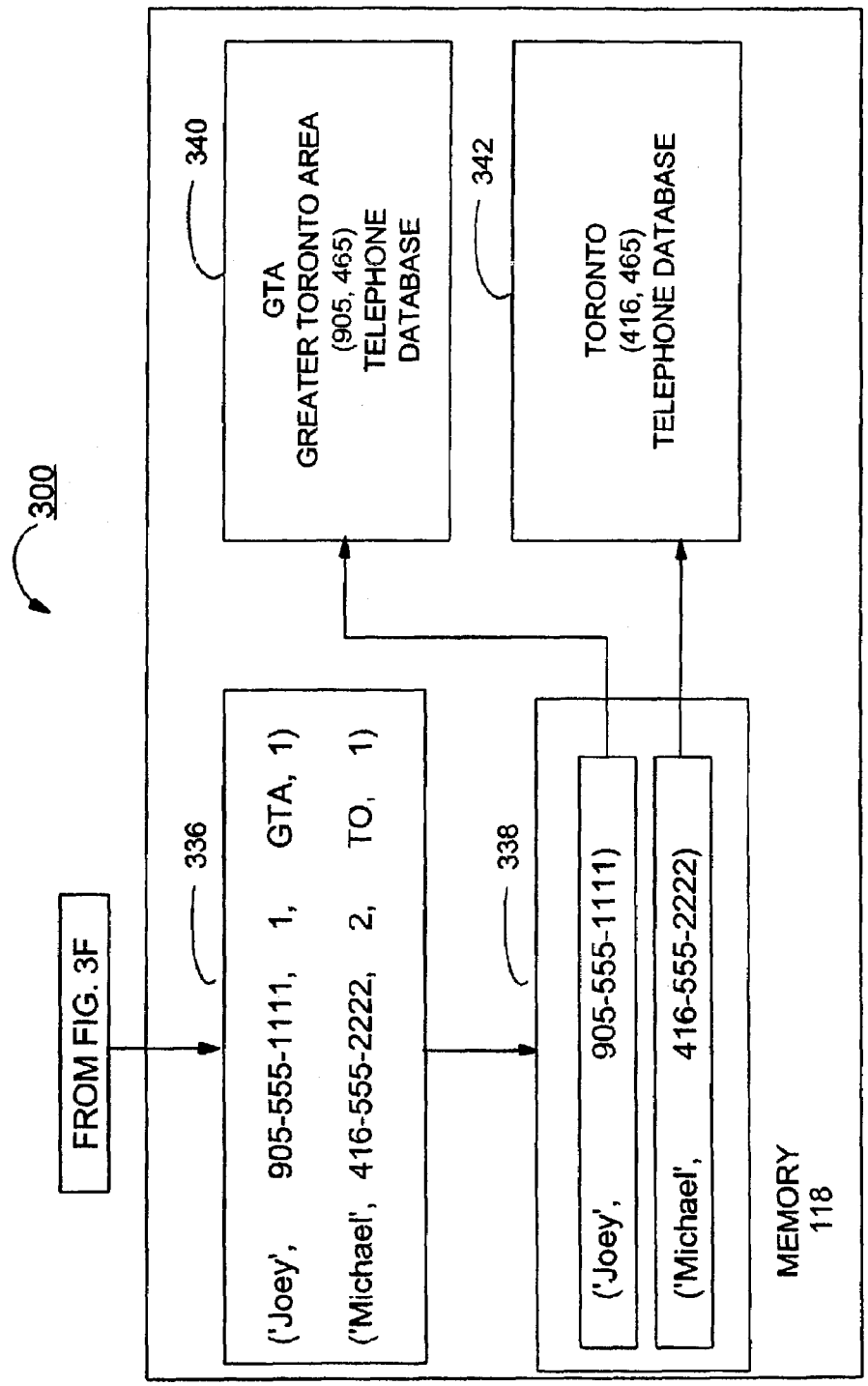

FIGS. 3A to 3G show the results of record selector 104 (of FIG. 1) processing collection of records 302 to generate collection 316 shown in FIG. 3A, collection 318 shown in FIG. 3B, collection 322 shown in FIG. 3C, collection 326 shown in FIG. 3D, collection 328 shown in FIG. 3E, collection 336, and collection 338 shown in FIG. 3G. The manner by which these collections of records are generated by record selector 104 will be described below.

Referring to FIG. 4, there is depicted operations of record selector 104 of FIG. 1. It will be understood that the depicted operations will be performed by record selector 104 unless stated otherwise. S402 indicates the beginning of operation of record selector 104. The scope of the invention is not limited to tables. The tables can be data residing in various databases or more broadly the selected records from a set of records can be placed in various destinations which will receive the selected records (depending on the operation of record selector 104).

Record selector 104 reads collection of records 302 of FIG. 3A (operation S404). Collection of records 302 can also be a set of records. In this example, collection or set of records 302 includes record 304 having a name and corresponding phone number. Column 306 identifies names of records of collection 302. Column 308 identifies phone numbers of records of collection 302. A first record (that is: Joe, 905-555-1111) indicates a name and a phone number which is insertable in a telephone book (that is, the GTA telephone table 201) designated for containing phone numbers for the '905' area code. A second record (that is: Mike, 416-555-2222) indicates a name and a phone number which is insertable in a telephone book (that is, the Toronto telephone table 202) designated for containing phone numbers for the '416' area code. A third record (that is: Fred, 465-555-3333) indicates a name and a phone number which is ambiguous because the third record could be insertable into both the GTA phone book 201 and the Toronto phone book 202 since both phone books are designated for containing phone numbers for the '465' area code. A fourth record (that is: Ted, 705-555-4444) indicates a name and a phone number that cannot be inserted into any known telephone book (there are no telephone books for containing phone numbers for the '705' area code). Record selector 104 selects records for 'Joe' and 'Mike' for insertion in their corresponding GTA and Toronto telephone databases, and rejects records for 'Fred' and 'Ted', as will be described below.

The purpose of the operation of record selector 104, which is depicted in FIG. 3A, is to generate or create a group of replicas in which each group of replicas corresponds to an individual uniquely identified record from the set of records 302. In block 310, each record belonging to the set of records 302 is uniquely identified. For example, the record beginning with 'Joe' is identified with '1'. Letters could have been used to uniquely identify each record. The matrix multiplication of block 312 and block 314 is a convenient way to generate a group of replicas for each uniquely identified record located in block 312. The groups of replicas are shown in collection 318 of FIG. 3B.

Record selector 104 generates block 310 by inserting column 312 of unique numbers into collection 302 so that each record is identifiable (operation S406). The unique numbers identifies a rank of the records. The sequence for ranking the records is not important. In this operation, the ranking of the records is indicated. Records for 'Joe', 'Mike', 'Fred' and 'Ted' are numbered or ranked '1', '2', '3', and '4' respectively. Also depicted in block 316 is array 314 having identification of tables into which valid records of collection 302 are to be inserted. Array 314 identifies the 'Toronto' and 'GTA' telephone tables. Included in array 314 is a null value (the purpose of which will be described later).

Record generator 104 requests (or performs) matrix multiplication of block 310 and array 314 to generate processed collection 318 of FIG. 3B (operation S408). For example, for uniquely identified record 'Joe' of block 310 of FIG. 3A, the matrix multiplication operation generates a grouping of three replicas, which are shown in collection 318 of FIG. 3B, in which the replicas of the group of replicas all begin with or identified by 'Joe', and each replica is tagged with a destination identifier 'TO' (for Toronto phone book), 'GTA' (for the Greater Toronto phone book), and 'NULL' (for the NULL destination or 'no' destination identification). Similar results are realized in collection 318 for uniquely identified record 'Mike', 'Fred', and 'Ted' of block 310, in that a grouping of replicas are created and which correspond to their respectively identified record located in block 310.

As a result of the matrix multiplication, collection 318 includes an extra column 320 of generated data. This operation generates multiple copies of each record of collection 302 in which each copy is either assigned to a specific telephone book table or is assigned to the null value. For example, collection 318 shows three occurrences of record (Joe, 905-555-1111) of collection 302 as a result of the matrix multiplication, in which record (Joe, 905-555-1111, 1, TO) is assignable to the Toronto telephone book table, record (Joe, 905-555-1111, 1, GTA) is assignable to the GTA telephone database, and record (Joe, 905-555-1111, 1, NULL) is not assignable to any table. A similar fate occurred for records 'Mike', 'Fred', and 'Ted' of collection 302.

The result of the matrix multiplication operation is that record selector 104 assigns a unique destination identification (that is, 'TO', 'GTA', or 'NULL') to each replica of a group of replicas (that is, one replica 'Joe' is tagged with destination identifier 'TO', another replica of record 'Joe' is tagged with destination identifier 'GTA', and yet another replica of record 'Joe' is tagged with destination identifier 'NULL'). Each group of replicas corresponds to a uniquely identified record of a set of records (grouping of replicas 'Joe' in collection 318 correspond to the uniquely identified record 'Joe' in block 310). A null destination is assigned to one replica of each group of replicas.

Record selector 104 initiates 'before triggers' for each record of processed collection 318 to generate triggered collection 322 of FIG. 3C. The names in column 324 of collection 322 are changed or modified according to the rules specified in the before triggers effective for the telephone table the record is assigned thereto (operation S410). The names associated with a null database continue to use the original name as found in collection 202 since they are not associated with a telephone table and thus no before triggers are applicable. The before trigger associated with the Toronto telephone book 202 generates formalized versions of the original name (such as 'Joseph', 'Michael', 'Frederick' and 'Theodore'). The before trigger associated with the GTA telephone book 201 generates informal versions of the original name (such as 'Joey', Mikey', 'Freddy' and 'Teddy').

The purpose of the operation which transforms collection 318 of FIG. 3B to collection 322 of FIG. 3C is to modify replicas in accordance with a record modification rule which rule is associated with a destination identification assigned to respective replicas. For example, for the replica identified as 'Joe' and tagged with destination identifier 'TO' in collection 318, a record modification rule associated with the destination 'TO' is used to modify this replica (that is, 'Joe' tagged with destination identifier 'TO' shown in collection 318) to generate the replica identified in collection 322 as 'Joseph' tagged with destination identifier 'TO'.

Record selector 104 filters records from processed collection 322 with constraints of each telephone book (table) to generate filtered collection 326 of FIG. 3D. More particularly, records tagged with an indicator (TO) of the Toronto phone book are filtered with the constraint of the Toronto phone book and those tagged with an indicator (GTA) of the GTA phone book are filtered with the constraints for the GTA phone book. This operation removes copies of records of collection 322 that violate the constraints associated with the telephone book with which the records are tagged (operation S412). Thus, records identified as 'Joseph' and 'Theodore' were removed because neither '905' nor '705' are valid area codes for the Toronto phone book; 'Mikey', and 'Teddy' were removed because neither '416' nor '705' are valid area codes for the GTA phone book. It is important to note that no records assigned to the NULL value are removed.

The purpose of the operation of record selector 104 as depicted in FIG. 3D is to select replicas which satisfy a record acceptance rule associated with a destination identification assigned to the respective replica. For example, applied to replica 'Joseph' tagged with destination identification 'TO' located in collection 322 is a record acceptance rule associated with destination 'TO'. The result of applying the record acceptance rule associated with destination 'TO' is to filter out or eliminate this replica. In another example, applied to replica 'Joey' tagged with destination identification 'GTA' located in collection 322 is a record acceptance rule associated with destination 'GTA'. The result of applying the record acceptance rule associated with destination 'GTA' is to filter in or include the replica 'Joey' tagged with destination identification 'GTA' in block 326 of FIG. 3D.

Record selector 104 ranks the records of filtered collection 326 to generate ranked collection 328 of FIG. 3E (operation S414). The records of collection 328 are shown ranked within their replica subgroup as shown, for example in replica subgroup 331 (in which 'TO' is ranked first, 'GTA' second and NULL is last). Column 330 depicts the ranking of the records contained in collection 328.

The first purpose for generating block 328 is that rule selector 104 can select, from an identified ranked group of replicas (for example, the ranked group of replicas that includes the replicas 'Joey' is tagged with destination identification 'GTA', and 'Joe' is tagged with destination identification 'NULL') only including a first replica (such as 'Joe') identified by an assigned null destination identification (that is, destination identification 'NULL') and including a second replica (that is, 'Joey') identified by an assigned destination identification (such as 'GTA). The second replica (that is 'Joey') identified by said identified assigned destination identification is selected for subsequent insertion into a destination (that is 'GTA'). Similar operational logic is applied to a group of replicas which includes 'Michael' and 'Mike'. For the group of replicas which includes 'Frederick', Freddy', 'Fred', this entire grouping of replicas becomes filtered out (that is, prevented from being included in block 328) because there are three listed or ranked replicas. For the grouping of replicas which includes only 'Ted', this entire grouping of replicas becomes filtered out.

Records selector 104 raises errors in FIG. 3F (operation S416) for records having a NULL value not associated with a rank of two (2). Since a NULL tagged record is ranked last, a NULL value is ranked '2' if and only if one record of the subgroup survived the filtering by the constraints and the record is assignable to a telephone book table (error indicators 330). Thus a NULL value ranked '2' indicates there is only one record to assigned to a telephone book: hence, there is no ambiguity.

The subgroup of 'Fred' shows a rank of '3' for the NULL value (error indicators 332) which indicates that the area code '465' was not filtered for either TORONTO or GTA. Thus an 'ambiguous target' error is raised. This error is raised whenever the rank is greater than 2 for a record. The subgroup of 'Ted' shows a rank of '1' for the NULL value (error indicators 334). This indicates that all records assigned to a phone book were filtered by the constraints. Thus a 'no target' error is being raised. The record selector 104 will stop processing if an error is found.

Record selector 104 filters out records that are associated with a null in ranked collection 328 to generated prepared collection 336 of FIG. 3G (operation S418). Record selector 104 continues to filter out or remove remaining extraneous data from collection 336 to generate collection 338. The operation depicted in FIG. 3G includes placing a selected replica identified by a identified assigned destination identification in an identified assigned destination identification associated with the selected replica. For example, the replica identified as 'Joey' tagged with destination identification 'GTA' is placed in destination 'GTA'.

Record selector 104 inserts records of collection 340 into their appropriate target database or table (operation S420). Alternatively, records of collection 342 can be inserted into their target database by DBMS 106. Operation of record selector 104 then ends (operation S422).

It will further be appreciated that the advantage of this invention is that it requires no sorting of records at any time. Neither does it require that records of different subgroups be processed at the same physical machine. The generation of unique values 312 of FIG. 3A can be achieved on distributed machines while choosing a "nested loop" join preserves the order of the phone books with the trailing NULL and keeps the subgroups as defined by 312 clustered. As a result no sorting is required to do the ranking. Thus the whole process of record selection can be performed in parallel for each record on physically disjoint systems without communication.

An embodiment of the invention provides a computer program product 133 for use with a computer including a central processing unit and random access memory. The computer program product includes a computer usable medium having computer readable code embodied in the medium. The computer program product includes computer readable program code for instructing the computer to implement the operations of the method described previously.

Another embodiment provides a computer program product for use with a computer including a central processing unit and random access memory. The computer program product includes a computer usable medium having computer readable code embodied in the medium. The computer program product includes computer readable program code for instructing the computer to implement the system components as described above.

In summary, in the present invention, records of information are classified for delivery to different targets or destinations even though it is not predictable as to which target a given unit of data (such as a record) should be routed. Classification allows database updating through an insert command.

It will be appreciated that variations of some elements are possible to adapt the invention for specific conditions or functions. The concepts of the present invention can be further extended to a variety of other applications that are clearly within the scope of this invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for use in a computing environment for determining a destination for a record for placement of said record in said destination, comprising:
   (a) forming a group of a plurality of replica records for said record, each replica record being a replica of said record;
   (b) assigning a different destination identification to each replica record, except one, of said group of replica records, each destination identification identifying a different associated one of a plurality of destinations;
   (c) determining exactly one appropriate destination of said plurality of destinations in which to place said record by determining which one, and only one, of said replica records in said group of replica records is an acceptable replica record that is acceptable to its assigned destination, selecting said assigned destination of said acceptable replica record as said appropriate destination for placement of said record, and discarding the replica records in said group of replica records which are not acceptable to their assigned destinations,
   wherein said determining exactly one appropriate destination includes selecting from an identified group of replica records only including a first replica record not assigned any of said destinations, and a second replica record identified by said assigned destination identification; and
   (d) placing said acceptable replica record in said assigned destination of said acceptable replica record.

2. The method of claim 1 wherein said destinations have associated record modification and acceptance rules, and further comprising:
   modifying said replica records having destination identification in accordance with record modification rules associated with the respective destinations of said replica records having destination identification.

3. The method of claim 1 wherein each of the plurality of destinations has associated record acceptance rules, and wherein the one replica record acceptable to its assigned destination satisfies record acceptance rules associated with its destination.

4. The method of claim 3 wherein the determining of the one replica record acceptable to its assigned destination includes selecting a replica record from a group of replica records having exactly two replica records remaining, one of said two replica records not identified with any of said plurality of destinations, and further comprising:
   choosing the one of said two replica records associated with one of said plurality of destinations.

5. The method of claim 4 further comprising placing said chosen replica record associated with a destination in said associated destination.

6. The method of claim 1 wherein said plurality of destinations comprise a plurality of tables.

7. A computer storage medium including program instructions for use with a data processing system having a central processing unit and associated memory, said program instructions for instructing said data processing system to implement a method for determining a destination for a record and placing said record in said destination, comprising the steps of:

(a) forming a group of a plurality of replica records for said record, each replica record being a replica of said record;

(b) assigning a different destination identification to each replica record, except one, of said group of replica records, each destination identification identifying a different associated one of a plurality of destinations;

(c) determining exactly one appropriate destination of said plurality of destinations in which to place said record by determining which one, and only one, of said replica records in said group of replica records is an acceptable replica record that is acceptable to its assigned destination, selecting said assigned destination of said acceptable replica record as said appropriate destination for placement of said record, and discarding the replica records in said group of replica records which are not acceptable to their assigned destinations, wherein said determining exactly one appropriate destination includes selecting from an identified group of replica records only including a first replica record not assigned any of said destinations, and a second replica record identified by said assigned destination identification; and (d) placing said acceptable replica record in said assigned destination of said acceptable replica record.

8. The computer storage medium of claim 7 wherein said destinations have associated record modification and acceptance rules, and wherein the data processing system further performs a step of:

modifying said replica records having destination identification in accordance with record modification rules associated with the respective destinations of said replica records having destination identification.

9. The computer storage medium of claim 7 wherein each of the plurality of destinations has associated record acceptance rules, and wherein the one replica record acceptable to its assigned destination satisfies record acceptance rules associated with its destination.

10. The computer storage medium of claim 9 wherein the determining of the one replica record acceptable to its assigned destination includes selecting a replica record from a group of replica records having exactly two replica records remaining, one of said two replica records not identified with any of said plurality of destinations, and wherein the data processing system further performs a step of choosing the one of said two replica records associated with one of said plurality of destinations.

11. The computer storage medium of claim 10 wherein the data processing system further performs a step of placing said chosen replica record associated with a destination in said associated destination.

12. The method of claim 7 wherein said plurality of destinations comprise a plurality of tables.

13. A data processing system comprising:

at least one central processing unit and associated memory;

a record allocator operatively coupled to said data processing system and implemented by said at least one processing unit, said record allocator for allocating a plurality of destinations for a plurality of records from a set of records;

a record selector operatively coupled to said data processing system and implemented by said at least one processing unit, said record selector for selecting a subset of records from said plurality of records for subsequent placement of said selected records in said plurality of destinations, each of said selected records to be subsequently placed in only one appropriate destination, wherein each destination has an associated record modification rule and an associated record acceptance rule; and a record former operative to form, for a record of said set of records, a group of replica records and associate each replica record of said group with a different one of said plurality of destinations except one of said replica records not associated with any of said plurality of destinations, and wherein the record selector selects one, and only one, of said replica records that satisfies said record acceptance rule of its associated destination and discards the replica records which do not satisfy said record acceptable rule of their associated destinations, such that said associated destination of said selected replica record is determined as said appropriate destination for placement of said record, wherein said record selector selects from an identified group of replica records only including a first replica record identified as said replica record not assigned with any of said plurality of destinations, and a second replica record identified by said associated destination, and wherein said record selector is operative to place said selected replica record in said associated destination.

14. The data processing system of claim 13 wherein said record selector is operative to assign a destination identification to each replica record of said group of replica records.

15. The data processing system of claim 14 wherein said record selector is operative to modify replica records of said group of replica records in accordance to said record modification rule associated with a destination identification assigned to respective replica records.

16. The data processing system of claim 13 wherein said plurality of destinations is a plurality of tables.

17. A computer storage medium including program instructions for use with a data processing system having a central processing unit and associated memory, said program instructions for instructing said data processing system to implement a data processing system comprising:

a record allocator operatively coupled to said data processing system, said record allocator for allocating a plurality of destinations for a plurality of records from set of records;

a record selector operatively coupled to said data processing system, said record selector for selecting a subset of records from said plurality of records for subsequent placement of said selected records in said plurality of destinations, each of the selected records to be subsequently placed in only one appropriate destination, wherein each destination has an associated record modification rule and an associated record acceptance rule; and a record former operative to form, for a record of said set of records, a group of replica records and associating each replica record of said group, except one of said replica records, with a different one of said plurality of destinations, said one of said replica records not associated with any of said plurality of destinations, and wherein the record selector selects the one, and only one, of said replica records that satisfies said record acceptance rule of its associated destination and discards the replica records which do not satisfy the record acceptance rule of their associated destinations, such that said associated destination of said selected replica record is determined as said appropriate destination of said record, wherein said record selector selects from an identified group of replica records only including a first replica record identified as said record not assigned with any of said plurality of destinations, and a second replica record identified by said associated destination, and wherein said record selector is operative to place said selected replica record in said associated destination.

18. The computer storage medium of claim 17 wherein said record selector is operative to assign a destination identification to each replica record of said group of replica records.

19. The computer storage medium of claim 18 wherein said record selector is operative to modify replica records of said group of replica records in accordance to said record modification rule associated with a destination identification assigned to respective replica records.

20. The computer storage medium of claim 17 wherein said plurality of destinations is a plurality of tables.

21. A computer-implemented method for use in a computing environment for determining a destination for a record for subsequent placement of said record in said destination, said destination being one of a plurality of destinations, each destination having an associated record modification rule and an associated record acceptance rule, comprising:

(a) assigning a destination identification, identifying one of said destinations, to each replica record of a group of a plurality of replica records except one replica record in said group, wherein each of a plurality of groups of replica records corresponds to a particular record of said set of records, each replica record being a replica of said particular record;

(b) assigning a null destination to said one replica record of said group of replica records; and (c) determining exactly one appropriate destination of said plurality of destinations in which to place at least one of said particular records by determining which one, and only one, of said replica records is acceptable to its assigned destination, further comprising selecting from an identified group of replica records only including a first replica record identified by said assigned null destination identification, and a second replica record identified by said assigned destination identification, selecting said assigned destination of said acceptable replica record as said appropriate destination for placement of said record, and discarding the replica records which are not acceptable to their assigned destination, wherein said acceptable replica record satisfies the record acceptance rule of said destination identified by said destination identification assigned to said acceptable replica; and (d) placing said acceptable replica record in said appropriate destination associated with said acceptable replica record.

22. The method of claim 21 further comprising modifying particular replica records in accordance to said record modification rule associated with a destination identification assigned to said particular replica records.

23. The method of claim 21 further comprising creating said group of replica records corresponding to said record.

24. The method of claim 21 wherein said plurality of destinations is a plurality of tables.

25. The method of claim 22 further comprising providing an error indicator for indicating if the only replica record remaining for said group of replica records is not assigned to a destination.

26. The method of claim 22 further comprising providing an error indicator for indicating if there are more than two replica records remaining for said group of replica records after said out of said replica records.

27. A computer storage medium including program instructions for use with a data processing system having a central processing unit and associated memory, said program instructions for instructing said data processing system to implement a method for use in a computing environment for determining a destination for a record for subsequent placement of said record in said destination, said destination being one of a plurality of destinations, each destination having an associated record modification rule and an associated record acceptance rule, comprising the steps of:

(a) assigning a destination identification, identifying one of said destinations, to each replica record of a group of a plurality of replica records except one replica record in said group, wherein each of a plurality of groups of replica records corresponds to a record of said set of records, each replica record being a replica of said corresponding record;

(b) assigning a null destination to said one replica record of said group of replica records; and (c) determining exactly one appropriate destination of said plurality of destinations in which to place at least one of said particular records by determining which one, and only one, of said replica records is acceptable to its assigned destination, selecting said assigned destination of said acceptable replica record as said appropriate destination for placement of said record and discarding the replica records which are not acceptable to their assigned destination, wherein said acceptable replica record satisfies the record acceptance rule of said destination identified by said destination identification assigned to said acceptable replica record, wherein said determining exactly one appropriate destination includes selecting from an identified group of replica records only including a first replica record identified by said assigned null destination identification, and a second replica record identified by said assigned destination identification; and (d) placing said acceptable replica record in said appropriate destination associated with said acceptable replica record.

28. The computer storage medium of claim 27 wherein the data processing system further performs a step of modifying particular replica records in accordance to said record modification rule associated with a destination identification assigned to said particular replica records.

29. The computer storage medium of claim 27 wherein the data processing system further performs a step of creating said group of replica records corresponding to said record.

30. The computer storage medium of claim 27 wherein said plurality of destinations is a plurality of tables.

31. The computer storage medium of claim 28 wherein the data processing system further performs a step of providing an error indicator for indicating if the only replica record remaining for said group of replica records is not assigned to a destination.

32. The computer readable medium of claim 27 wherein the data processing system further performs a step of providing an error indicator for indicating if there are more than two replica records remaining for said group of replica records after said discarding of said replica records.

33. A data processing system comprising:
at least one central processing unit and associated memory;
a record creator operatively coupled to the data processing system and implemented by the at least one processing unit, the record creator for directing said data processing system to create a group of replica records corresponding to a record of a set of records, each replica record, except ones, being assigned a destination from a plurality of destinations, and each replica record being a replica of said corresponding record; and
a record selector operatively coupled to the data processing system and implemented by the at least one processing unit, said record selector for directing said data processing system to select said replica records for subsequent placement of selected replica records in particular destinations, each of said selected records to be subsequently placed in only one appropriate destination of said plurality of destinations, wherein each of said destinations has an associated record modification rule and an associated record acceptance rule, and wherein said one appropriate destination is determined by determining which ones, and only one, of said replica records in said group of replica records is an acceptable replica record that satisfies the record acceptance rule of its assigned destination, selecting said assigned destination of said acceptable replica record as said appropriate destination for placement of said record, and discarding the replica records in said group of replica records which do not satisfy the record acceptance rule of their assigned destinations,
wherein said record selector directs said data processing system to select a replica record from an identified group of replica records only including a first replica record identified by an assigned null destination identification, and a second replica record identified by an assigned destination identification, and
wherein said record selector directs said data processing system to place said acceptable replica record in said appropriate destination associated with said acceptable replica record.

34. The data processing system of claim 33 wherein said record selector directs said data processing system to assign a destination identification to each of said replica records of said group of replica records, wherein a null destination is assigned to one replica record of said group of replica records.

35. The data processing system of claim 34 wherein said record selector directs said data processing system to modify particular replica records in accordance to a record modification rule associated with a destination identification assigned to said particular replica records.

36. The data processing system of claim 33 wherein said plurality of destinations is a plurality of tables.

37. The data processing system of claim 35 further providing an error indicator for indicating if the only replica record remaining for said group of replica records is not assigned to a destination.

38. The data processing system of claim 35 further comprising providing an error indicator for indicating if there are more than two replica records remaining for said group of replica records after said discarding of said replica records.

39. A computer storage medium including program instructions for use with a data processing system having a central processing unit and associated memory, said program instructions for instructing said data processing system to implement a data processing system comprising:
a record creator operatively coupled to the data processing system, the record creator for directing said data processing system to create a group of replica records corresponding to a record of a set of records, each replica record, except ones, being assigned a destination from a plurality of destinations, and each replica record being a replica of said corresponding record; and
a record selector operatively coupled to the data processing system, said record selector for directing said data processing system to select said replica records for subsequent placement of selected replica records in particular destinations, each of said selected records to be subsequently placed in only one appropriate destination of said plurality of destinations, wherein each of said destinations has an associated record modification rule and an associated record acceptance rule, and wherein said one appropriate destination is determined by determining which ones, and only one, of said replica records in said group of replica records is an acceptable replica record that satisfies the record acceptance rule of its assigned destination, selecting said assigned destination of said acceptable replica record as said appropriate destination for placement of said record, and discarding the replica records in said group of replica records which do not satisfy the record acceptance rule of their assigned destinations,
wherein said record selector directs said data processing system to select a replica record from an identified group of replica records only including a first replica record identified by an assigned null destination identification, and a second replica record identified by an assigned destination identification, and
wherein said record selector directs said data processing system to place said acceptable replica record in said appropriate destination associated with said acceptable replica record.

40. The computer storage medium of claim 39 wherein said record selector directs said data processing system to assign a destination identification to each of said replica records of said group of replica records, wherein a null destination is assigned to one replica record of said group of replica records.

41. The computer storage medium of claim 40 wherein said record selector directs said data processing system to modify particular replica records in accordance to a record modification rule associated with a destination identification assigned to said particular replica records.

42. The computer storage medium of claim 39 wherein said plurality of destinations is a plurality of tables.

43. The computer storage medium of claim 41 further providing an error indicator for indicating if the only replica record remaining for said group of replica.

44. The data processing system of claim 41 further comprising providing an error indicator for indicating if there are more than two replica records remaining for said group of replica records after said discarding of said replica records.

* * * * *